(12) United States Patent
Saini et al.

(10) Patent No.: US 7,795,186 B2
(45) Date of Patent: Sep. 14, 2010

(54) FLUID-LOSS CONTROL PILLS COMPRISING BREAKERS THAT COMPRISE ORTHOESTERS AND/OR POLY(ORTHOESTERS) AND METHODS OF USE

(75) Inventors: Rajesh K. Saini, Duncan, OK (US); Karen Savery, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/488,966

(22) Filed: Jun. 22, 2009

(65) Prior Publication Data

US 2009/0258801 A1  Oct. 15, 2009

Related U.S. Application Data

(63) Continuation of application No. 11/217,955, filed on Sep. 1, 2005, now abandoned.

(51) Int. Cl.
*E21B 43/26* (2006.01)
*C09K 8/70* (2006.01)

(52) U.S. Cl. .............. 507/261; 507/213; 507/214; 507/215; 507/224; 507/229; 507/230; 507/237; 507/242; 507/246; 507/248; 507/266; 507/269; 166/308.2; 166/308.6; 166/311

(58) Field of Classification Search ............... None
See application file for complete search history.

(56) References Cited

U.S. PATENT DOCUMENTS

| | | | | |
|---|---|---|---|---|
| 4,652,384 A * | 3/1987 | Francis et al. | ............... | 507/111 |
| 6,180,571 B1 * | 1/2001 | Sifferman et al. | ............ | 507/110 |
| 6,763,888 B1 * | 7/2004 | Harris et al. | ............. | 166/305.1 |
| 7,080,688 B2 * | 7/2006 | Todd et al. | ................... | 166/278 |
| 7,140,438 B2 * | 11/2006 | Frost et al. | ................... | 166/278 |
| 7,168,489 B2 * | 1/2007 | Frost et al. | ................... | 166/278 |
| 7,299,876 B2 | 11/2007 | Lord et al. | | |
| 7,353,876 B2 | 4/2008 | Savery et al. | | |
| 7,353,879 B2 | 4/2008 | Todd et al. | | |
| 7,413,017 B2 | 8/2008 | Nguyen et al. | | |
| 7,448,450 B2 | 11/2008 | Luke et al. | | |
| 7,455,112 B2 | 11/2008 | Moorehead et al. | | |
| 7,461,697 B2 | 12/2008 | Todd et al. | | |
| 7,475,728 B2 | 1/2009 | Pauls et al. | | |
| 7,484,564 B2 | 2/2009 | Welton et al. | | |
| 7,497,258 B2 | 3/2009 | Savery et al. | | |
| 7,497,278 B2 | 3/2009 | Schriener et al. | | |
| 7,506,689 B2 | 3/2009 | Surjaatmadja et al. | | |
| 2006/0169448 A1 | 8/2006 | Savery et al. | | |
| 2006/0169452 A1 | 8/2006 | Savery et al. | | |
| 2006/0169453 A1 | 8/2006 | Savery et al. | | |
| 2006/0172893 A1 | 8/2006 | Todd et al. | | |
| 2006/0205608 A1 | 9/2006 | Todd | | |
| 2006/0243449 A1 | 11/2006 | Welton et al. | | |
| 2006/0247135 A1 | 11/2006 | Welton et al. | | |
| 2006/0254774 A1 | 11/2006 | Saini et al. | | |
| 2006/0283597 A1 * | 12/2006 | Schriener et al. | ............ | 166/300 |
| 2007/0042912 A1 | 2/2007 | Welton et al. | | |
| 2007/0066492 A1 | 3/2007 | Funkhouser et al. | | |
| 2007/0066493 A1 | 3/2007 | Funkhouser et al. | | |
| 2007/0078063 A1 | 4/2007 | Munoz | | |
| 2007/0078064 A1 | 4/2007 | Munoz et al. | | |
| 2007/0238623 A1 | 10/2007 | Saini et al. | | |
| 2007/0281868 A1 | 12/2007 | Pauls et al. | | |
| 2008/0026955 A1 | 1/2008 | Munoz et al. | | |
| 2008/0026959 A1 | 1/2008 | Munoz et al. | | |
| 2008/0026960 A1 | 1/2008 | Munoz et al. | | |
| 2008/0027157 A1 | 1/2008 | Munoz et al. | | |
| 2008/0070810 A1 | 3/2008 | Mang | | |
| 2008/0139415 A1 | 6/2008 | Todd et al. | | |
| 2008/0169102 A1 | 7/2008 | Carbajal et al. | | |
| 2009/0062157 A1 | 3/2009 | Munoz et al. | | |

FOREIGN PATENT DOCUMENTS

WO   WO 0057022 A1 *  9/2000

OTHER PUBLICATIONS

NatureWorks Product Bulletin entitled NatureWorks PLA Polymer 3001D, Injection Molding Process Guide, 2005.
NatureWorks Product Bulletin entitled NatureWorks PLA Polymer 4060D, For Heat Seal Layer in Coextruded Oriented Films, 2005.
NatureWorks article entitled NatureWorks, Crystallizing and Drying of PLA, 2005.

* cited by examiner

*Primary Examiner*—James Seidleck
*Assistant Examiner*—John J Figueroa
(74) *Attorney, Agent, or Firm*—Robert A. Kent; Baker Botts L.L.P.

(57) ABSTRACT

Provided herein are methods and compositions for generating acids for use downhole, for example, to break fluid-loss control pills. The delayed-release acid breakers of the present invention comprise orthoesters and/or poly(orthoesters).

15 Claims, No Drawings

FLUID-LOSS CONTROL PILLS COMPRISING BREAKERS THAT COMPRISE ORTHOESTERS AND/OR POLY(ORTHOESTERS) AND METHODS OF USE

CROSS REFERENCE TO RELATED APPLICATIONS

The present invention is a continuation of U.S. patent application Ser. No. 11/217,955, entitled "Fluid-Loss Control Pills Comprising Breakers That Comprise Orthoesters and/or Poly(orthoesters) and Methods of Use," filed on Sep. 1, 2005 now abandoned, the entire disclosure of which is incorporated herein by reference.

BACKGROUND OF THE INVENTION

The present invention relates to methods and compositions for treating subterranean formations, and more specifically, to self-destructing fluid-loss control pills for fluid-loss control in drilling, completion, and stimulation applications and their associated methods. "Fluid loss" refers to the undesirable migration or loss of fluids (such as the fluid portion of a drilling mud or cement slurry) into a subterranean formation.

Providing effective fluid-loss control for well treatment fluids is highly desirable. A "well treatment fluid" is a fluid used in a subterranean application. The term "treatment" herein does not imply any particular action by the fluid or any component thereof. Fluid-loss control materials are additives specifically designed to lower the volume of a filtrate that passes through a filter medium. Most attain their fluid-loss control from the presence of solvent-specific solids, or from hydrated linear polymers that rely on filter cake backup and on viscoelasticity to inhibit flow into and through the formation. A variety of fluid-loss control materials have been used and evaluated, including foams, oil-soluble resins, acid-soluble particulates, graded salt slurries, linear viscoelastic polymers, and heavy metal-crosslinked polymers. Their respective comparative effects are well documented. Other techniques that have been developed to control fluid loss include the use of "fluid-loss control pills," which sometimes are referred to as "lost circulation pills." A "fluid-loss control pill" is a gelled fluid that is designed or used to provide some degree of fluid-loss control. Through a combination of viscosity, solids bridging, and cake buildup on the porous rock, these pills oftentimes are able to substantially seal off portions of the formation from fluid loss. They also generally enhance filter-cake buildup on the face of the formation to inhibit fluid flow into the formation from the well bore.

Typically, fluid-loss control pills comprise an aqueous base fluid and a high concentration of a gelling agent polymer (usually crosslinked), and sometimes, bridging particles, like graded sand, potassium salts, or sized calcium carbonate particles. The term "gel," as used herein, and its derivatives refers to a semi-solid, jelly-like state assumed by some colloidal dispersions. The most commonly used fluid-loss control pills contain high concentrations (100 to 150 lbs/1000 gal) of hydroxyethylcellulose ("HEC"). HEC is generally accepted as a gelling agent affording minimal permeability damage during completion operations. Normally, HEC polymer solutions do not form rigid gels, but control fluid loss by a viscosity-regulated or filtration mechanism. Some other gelling agent polymers that have been used include guar, guar derivatives, carboxymethylhydroxyethylcellulose ("CMHEC"), and even starch.

As an alternative to linear polymeric gels for fluid-loss control pills, crosslinked gels often are used. Crosslinking the gelling agent polymer creates a gel structure that can support solids as well as provide fluid-loss control. Further, crosslinked fluid-loss control pills have demonstrated that they require relatively limited invasion of the formation face to be fully effective. To crosslink the gelling agent polymers, a suitable crosslinking agent that comprises polyvalent metal ions is used. Aluminum, titanium, and zirconium are common examples.

A preferred crosslinkable gelling agent for fluid-loss control pills are graft copolymers of a hydroxyalkyl cellulose, guar, or hydroxypropyl guar that are prepared by a redox reaction with vinyl phosphonic acid. The gel is formed by hydrating the graft copolymer in an aqueous fluid containing at least a trace amount of at least one divalent cation. The gel is crosslinked by the addition of a Lewis base or Bronsted-Lowrey base so that pH of the fluid is adjusted from slightly acidic to slightly basic. Preferably, the chosen base is substantially free of polyvalent metal ions. The resulting crosslinked gel demonstrates shear-thinning and rehealing properties that provide relatively easy pumping, while the rehealed gel provides good fluid-loss control upon placement. This gel can be broken by reducing the pH of the fluid. Some fluid-loss pills of this type are described in U.S. Pat. No. 5,304,620, assigned to Halliburton Energy Sources, the relevant disclosure of which is incorporated herein by reference. Fluid-loss control pills of this type are commercially available under the trade name "K-MAX" from Halliburton Energy Services in Duncan, Okla.

After their application, fluid-loss control pills can cause severe damage to near-well bore areas due to polymer filtration or filter-cake formation. At some point in the completion operation, the filter cake resulting from a fluid-loss control pill must be removed to restore the formation's permeability, preferably to at least its original level. If the formation permeability is not restored to its original level, production levels can be significantly reduced.

Polymer-based fluid-loss control pills often require long cleanup periods. Moreover, an effective cleanup usually requires fluid circulation to provide high driving force, which allows diffusion to take place to help dissolve the concentrated build up of materials. Such fluid circulation may not be feasible. Additionally, in lower temperature wells (i.e., those below about 80° F.), it is often difficult to find an internal breaker for the fluid-loss control pills that will work effectively. Although conventional breakers (both internal and external) tend to work very quickly, usually within hours, they often do not provide predictable breaks, and thus there is little control over the break. As a result, secondary precipitation materials may result that may be damaging to the formation. The term "break" (and its derivatives) as used herein refers to a reduction in the viscosity of the fluid-loss control pill, e.g., by the breaking or reversing of the crosslinks between polymer molecules, or some breaking of the gelling agent polymers. No particular mechanism is implied by the term. Another conventional method of cleaning up a fluid-loss control pill is to add a spot of a strong acid (e.g., 10% to 15% hydrochloric acid) with coiled tubing, which is expensive and can result in hazardous conditions.

SUMMARY OF THE INVENTION

The present invention relates to methods and compositions for treating subterranean formations, and more specifically, to self-destructing fluid-loss control pills for fluid-loss control in drilling completion, and stimulation applications, and their associated methods.

One embodiment of the present invention provides a method comprising: providing a fluid-loss control pill that comprises an aqueous base fluid and a gelling agent, and a delayed-release acid breaker that comprises an orthoester and/or a poly(orthoester); introducing the fluid-loss control pill and the delayed-release acid breaker into a subterranean formation; allowing the delayed-release acid breaker to generate an acid after a delay period; and allowing the fluid-loss control pill to break.

Another embodiment of the present invention provides a fluid-loss control pill base gel that comprises a delayed-acid release breaker that comprises an orthoester and/or a poly(orthoester).

Another embodiment of the present invention provides a method comprising: providing a delayed-release acid breaker that comprises an orthoester and/or a poly(orthoester), and a fluid-loss control pill base gel having a pH below about 8; forming a first emulsion that comprises the delayed-release acid breaker and water; adding the first emulsion to the fluid-loss control pill base gel to form a second emulsion having a continuous phase and a discontinuous phase, the discontinuous phase comprising the delayed-release acid breaker and the continuous phase comprising the fluid-loss control pill base gel; and introducing the second emulsion into a subterranean formation.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods and compositions for treating subterranean formations, and more specifically, to self-destructing fluid-loss control pills for fluid-loss control in drilling completion, and stimulation applications, and their associated methods.

One of the many advantages of the present invention is that the breaking of the fluid-loss control pills of this invention can be delayed for a desired delay period (e.g., days or even weeks). On the other hand, degradation of the fluid-loss pills can occur relatively quickly and predictably if necessary, without the need for external intervention, such as from coiled tubing trips or acid spotting. In certain embodiments, this invention provides methods of combining the delayed-release acid breakers of the invention with a fluid-loss control pill base gel at a low pH (i.e., a pH of less than about 8) for introduction to a subterranean formation. The term "base gel" as used herein refers to a point in time before the gel is crosslinked, to form a crosslinked fluid loss control pill and/or the pH is raised such that the base gel is able to be crosslinked to form a pill. In certain embodiments, the delayed-release acid breakers of this invention may be incorporated within the fluid-loss control pill base gel in a manner so as to delay degradation of the fluid-loss control pill.

The self-destructing fluid-loss control pills of the present invention comprise an aqueous base fluid, a gelling agent, and a delayed-release acid breaker. In some embodiments, the gelling agent may be crosslinked; in others it may not. This may depend on the particular gelling agent used (e.g., a lower molecular weight gelling agent v.s. a higher molecular weight gelling agent) and the concentration of gelling agent used. It may be preferred to use a crosslinked gelling agent because less gelling agent should be used, which may translate to less of the breaker being needed, and less residue being produced upon breaking. In some embodiments, the gelling agent may not be initially crosslinked, but may crosslink downhole (e.g., during pumping) with an appropriate crosslinking agent. Preferably, the gelling agent is crosslinked before the pill is placed in the subterranean formation (e.g., before pumping or during pumping).

Optionally, the self-destructing fluid-loss control pills of the present invention may comprise propylene glycol (as an antifreeze agent); gel stabilizers (e.g., for use at higher temperatures such as those about 225° F.); clay fixers; bridging particulates (degradable or nondegradable); surfactants; corrosion inhibitors; biocides; pH control additives; oxidizers; encapsulated breakers; weighting agents (e.g., hematite, barite, or calcium carbonate); or any other additives that are suitable for use in conjunction with the self-destructing fluid-loss control pills of the present invention, which may be recognized by one of ordinary skill in the art with the benefit of this disclosure.

Suitable aqueous base fluids include fresh water, salt water, brines, seawater, or any other aqueous liquid that does not adversely react with the other components used in accordance with this invention or with the subterranean formation. Aqueous base fluids that are commonly used in oilfield operations usually include sodium chloride brines, potassium chloride brines, calcium chloride brines, zinc chloride brines, ammonium chloride brines, sodium bromide brines, calcium bromide brines, zinc bromide brines, or some mixture of these components. Such brines may be used to weight the fluid, inhibit the swelling of clays present in the subterranean formation, or the like. Monovalent and divalent brines are preferred for use in the present invention. One should note that in some fluid-loss control pills (such as hydroxyethylcellulose low pH pills), divalent brines may present a crosslinking problem at higher pHs.

Although noncrosslinked gelling agents may be used, crosslinked gelling agents are preferred, as discussed above. The term "crosslinked gelling agent," as used herein, refers to a gelling agent that has at least one crosslink between its molecules. These gelling agents may be crosslinked by any suitable crosslinking agent and methodology. Suitable crosslinking agents include those that comprise polyvalent metal ions, a Lewis base, a Bronsted-Lowrey base, boron, titanium, zirconium, and the like. Examples of gelling agents that may be used in the present invention include any crosslinked natural polymer, synthetic polymer, derivatives thereof, or combinations thereof that are suitable for use in a subterranean application. The particular crosslinking agent chosen will depend on, among other things, the gelling agent used, the pH of the fluid-loss control pill, the pH of the environment in which the fluid-loss control pill will be used, and the like. It is preferable if the gelling agent crosslinks slowly as it is being pumped to a desired portion of a subterranean formation. Although not necessary, this slow crosslinking is preferred because of pumping and friction pressure considerations. Examples of suitable gelling agents that may or may not be crosslinked, depending on the factors discussed above, include, but are not limited to: xanthan, xanthan derivatives, guar, guar derivatives (such as hydroxypropyl guar, caraboxymethyl guar, and carboxymethylhydroxypropyl guar), cellulose and cellulose derivatives (such as hydroxyethyl cellulose, and carboxymethyethyl cellulose). Cellulose derivatives are preferred because they are capable of viscosifying a brine without the need for special rig equipment or shear devices. Preferred cellulose derivatives are either anionic or nonionic, most preferably anionic modified or nonionic modified cellulose. Carboxymethylhydroxyethyl cellulose ("CMHEC") and hydroxyethyl cellulose ("HEC") are examples of preferred cellulose derivatives. Another particularly preferred cellulose derivative is a graft copolymer of hydroxyethyl or hydroxypropyl cellulose prepared by a redox reaction with vinyl phosphonic acid monomers or polymers. The cellulose derivatives are preferred because 90% or greater regain permeability can be achieved after the fluid-loss control pill breaks. Examples of suitable synthetic polymers include, but are not limited to, polyacrylate, polymethacrylate, polyacrylamide, polyvinyl alcohol, and polyvinylpyrrolidone. In some embodiments, the gelling agent may be depolymerized. The term "depolymerized," as used herein, generally refers to a decrease in the molecular weight of the gelling agent. Depolymerized gelling agents are described in U.S. Pat. No. 6,488,091 issued Dec. 3, 2002 to Weaver, et al., the relevant disclosure of which is incorporated herein by reference. In some embodiments, a base gel may be prepared by dissolving at least one of the above mentioned gelling agents in an amount of from about 10 to about 175 pounds per 1000 gallons of the fluid. Suitable crosslinked gelling agents generally are present in an amount in the range of from about 10 to about 40 pounds per 1000 gallons of base gel.

The fluid-loss control pill may be broken (i.e., its viscosity may be reduced) by lowering the pH of the fluid by addition of a delayed-release acid breaker of the present invention. The delayed-release acid breakers of the present invention comprise orthoesters and/or poly(orthoesters), which will generate an acid downhole in a delayed fashion that will break the fluid-loss control pills. This delay period may vary, and can be controlled from days or even weeks, if desired. In preferred embodiments, the desired delay period may be from days to about two weeks.

Examples of suitable orthoesters for use in the delayed-release acid breakers of the present invention have a structure described by the formula: RC(OR')(OR")(OR'''), wherein R', R", and R''' are not hydrogen, and R', R", and R''' may or may not be the same group. R', R", or R''' may comprise a heteroatom that may affect the solubility of the chosen orthoester in a given application. Suitable heteroatoms could include nitrogen or oxygen. Suitable poly(orthoesters) also are described in an article entitled, *Poly(orthoesters)—From Concept to Reality*, BIOMACROMOLECULES, Vol 5, 1625 (2004), and references cited therein. Examples of suitable orthoesters and poly(orthoesters) include, but are not limited to, orthoacetates, such as trimethyl orthoacetate, triethyl orthoacetate, tripropyl orthoacetate, triisopropyl orthoacetate, tributyl orthoacetates, and poly(orthoacetates); orthoformates, such as trimethyl orthoformate, triethyl orthoformate, tripropyl orthoformate, triisopropyl orthoformate, tributyl orthoformate, and poly(orthoformates); and orthopropionates, such as trimethyl orthopropionate, triethyl orthopropionate, tripropyl orthopropionate, triisopropyl orthopropionate, tributyl orthopropionate, and poly(orthopropionates). Suitable orthoesters also may be orthoesters of polyfunctional alcohols, such as glycerin and/or ethylene glycol. Those skilled in the art with the benefit of this disclosure will recognize suitable orthoesters and/or poly(orthoesters) that may be used in a desired application. In choosing an orthoester, one should be mindful that some orthoesters have low flash points. Various derivatives of those orthoesters can be synthesized by transesterification with variety of alcohols, sugars, or polyols. One should be mindful that to synthesize these molecules, there should not be any free alcohol groups left after the synthesis, which can further transesterify and possibly break the molecule. Depending on the desired application, the orthoesters or the poly(orthoesters) may be water soluble, water insoluble, or solid. Generally speaking, water soluble orthoesters are easy to hydrolyze at lower temperature in comparison to water insoluble orthoesters. By making an orthoester or a poly (orthoester) more hydrophobic, the orthoester may be more suitable for use in higher temperature applications. Also, poly(orthoesters) made by glycerol and trimethyl orthoformate are water soluble depending on the number of repeating units and can be used for lower temperature applications. One of the advantages of having a poly(orthoester) over an orthoester is that it has a higher flash point and a higher viscosity. Similarly, hydrophobic poly(orthoesters) may be synthesized, which are suitable for higher temperature applications. The choice of which particular orthoester to use should be guided by such considerations as environmental factors, and the desired delay time before a sufficient amount of acid is generated to break the fluid-loss control pill. One should also note that orthoesters and polyorthoesters can be selected to either give you formic or acetic acid on hydrolysis. For applications adjacent to acid-sensitive zones, weaker acids, such as formic and acetic acid, can be used with a slight increase in the amount of time needed for removal of fluid loss control pill.

The amount of a delayed-release acid breaker of the present invention needed to break the fluid-loss control pill will depend on the composition of the fluid-loss control pill (e.g., the gelling agent, the degree of crosslinking, etc.), the amount of inhibitor present, the temperature of the formation, and other considerations recognized by one skilled in the art with the benefit of this disclosure. Generally speaking, the amount of the breaker to include is an amount sufficient to neutralize any inhibitor that may be present, and reduce the pH of the fluid-loss control pill to a level sufficient to break it. This amount will be determinable by one of ordinary skill in the art with the benefit of this disclosure. In some embodiments, this may be from about 1% to about 10% based on the volume of fluid loss control pill.

The orthoesters and/or poly(orthoesters) used in the delayed-release acid breakers of the present invention can have any suitable form. For instance, these compositions can be used in a solution form, a gel form, a solid form, or an emulsion form. In certain applications, a solution form may be useful, e.g., when a faster break of a pill is desired; in other applications, e.g., when a slower break is desirable, a gel or emulsion form may be most suitable. For the solution form, suitable exemplary solvents include propylene glycol, propylene glycol monomethyl ether, dipropylene glycol monomethyl ether, and ethylene glycol monobutyl ether. In some embodiments, mixtures of solvents and water may be beneficial, for example, to keep the orthoester solubilized. The gel form of the orthoester composition may be gelled with suitable polymers and/or surfactants. For the emulsion form, suitable emulsifiers include emulsifiers like "WS-44," which is commercially available from Halliburton Energy Services, Duncan, Okla.

To allow the orthoester to hydrolyze to produce an acid, a source of water is needed. The water should be present in an amount of about 2 moles of water for about every 1 mole of orthoester or poly(orthoester) to an excess of water, which may help ensure the solubility of the reaction product of the reaction between the generated acid and the components in the fluid-loss control pill. One of ordinary skill in the art with the benefit of this disclosure will recognize whether a suitable amount of water is present in either the fluid-loss control pill, the well fluid, or otherwise in the well bore for a desired application.

The delayed-release acid breakers of the present invention are generally stable at a pH of about 8 or above. To maintain the delay, preferably the pH should be maintained at 8 or above. To maintain this pH, the delayed-release acid breakers or the fluid-loss control pill may comprise an inhibitor. The inhibitor may further delay the generation of the acid from the orthoester of the orthoester composition, and also may neutralize the generated acid during the delay period. Suitable inhibitors include bases. Examples of some preferred inhibitors may include sodium hydroxide, potassium hydroxide, magnesium oxide, magnesium hydroxide, calcium oxide, calcium hydroxide, amines (such as hexamethylenetetramine), sodium carbonate, potassium carobonate, derivatives of these, and combinations of these. In certain embodiments, a small amount of a strong base as opposed to a large amount of a relatively weak base is preferred to achieve the delayed generation of the acid and the neutralization of the generated acid for a desired delay period.

Depending on the pH of the fluid-loss control pill base gel (i.e., the pH of the fluid-loss control pill base gel before raising the pH or before crosslinking and/or before adding the breaker), the breaker may need to be incorporated in a certain manner depending on the stability of the breaker to the pH of the base gel. This is because the degradation of orthoesters and poly(orthoesters) is acid-catalyzed. If the fluid-loss base gel has a high pH (e.g., a pH of 8 or greater), then the orthoester breaker can be added directly to the fluid-loss control pill base gel with little risk of negatively impacting the breaker, followed by the inhibitor and a crosslinking agent if desired. Such base gels include those that comprise guar, guar derivatives, hydroxyethyl cellulose, carboxymethylhydroxyethyl cellulose, and Halliburton Energy Services' "HMP" pill, which is currently available from Halliburton Energy Services. Optionally, an emulsifying surfactant may be added to keep the hydrophobic orthoester intimately mixed with the base gel. Sometimes, however, the base gel is a relatively hard gel and it may phase separate when mixed with the breaker. Adding the delayed-release acid breaker by way of an emulsion may be useful in such instances. Since orthoesters and poly(orthoesters) are relatively sensitive to acidic pH, if the fluid-loss control pill base gel is acidic (e.g., vinyl phosphonic acid grafted hydroxyethylcellulose pill or guar pill also called K-MAX pill), to effectively incorporate the breaker into the base gel, a procedure should be used to protect the breaker from the base gel while incorporating the breaker into the base gel. In one embodiment, this may be accomplished by making an emulsion of the breaker in water, and adding it simultaneously with a pH increasing inhibitor and suitable crosslinking agent (if desired) to the base gel. In another embodiment, the emulsion may be formed with a breaker, and a crosslinking agent in an aqueous fluid. An inhibitor may be added if desired. In another embodiment, a poly(orthoester) may be synthesized such that it is sufficiently hydrophobic so that it can withstand the low pH without hydrolyzing while it is being incorporated into the base gel, e.g., as a solid or liquid. Simultaneous addition of the delayed-release acid breaker of the present invention and a crosslinking agent when used is preferred because it allows the breaker to be distributed evenly within the base gel; it may be difficult to mix the breaker into an already crosslinked pill. Addition of orthoester to the K-MAX type of pill by first increasing the pH is also difficult because these base gels tend to crosslink on increasing the pH and it becomes very difficult to mix breaker effectively in this crosslinked fluid. So it is much more desirable to add the breaker, crosslinker and inhibitor simultaneously to the base gel.

In the emulsion embodiments (e.g., where the fluid-loss control pill base gel has a low pH), the emulsion of the delayed-release acid breaker may be formed with water, a suitable emulsifying surfactant, optionally an inhibitor (e.g., wherein it is desirable to protect the orthoester or poly (orthoester) from degradation during addition to a low pH base gel or when a longer delay time is desired), and optionally a crosslinking agent. An example of a fluid-loss control pill having a pH of about 1 is described in U.S. Pat. No. 5,304,620, the relevant disclosure of which is incorporated herein by reference. Fluid-loss control pills of this type are commercially available under the trade name "K-MAX" from Halliburton Energy Services in Duncan, Okla. If a crosslinking agent is used, the crosslinking agent may help create a basic emulsion, which helps maintain the stability of the orthoester or the poly(orthoester) in the delayed-release acid breaker. The resultant emulsion can be added to the pill at a lower pH such that the delayed-release acid breaker becomes the discontinuous phase and the fluid-loss control pill becomes the continuous phase in a second emulsion. This second emulsion then can be pumped downhole for fluid-loss control. In preferred embodiments, the gelling agent is crosslinked after the emulsion has been added to the fluid-loss control pill. Another advantage of placing the breaker in an emulsion is that the breaker is mixed in the fluid-loss control pill in relatively even fashion (as the discontinuous phase), which allows for a cleaner break of the fluid-loss control pill. Preferably, the first emulsion is basic, e.g., a pH of about 8 or above. To maintain the pH of the emulsion at a desired level, a suitable inhibitor may be added to the emulsion. The concentration of this inhibitor is one of the main factors in determining the desired break time for the pill. The greater the inhibitor concentration, the greater the delay time before breaking the pill.

Suitable emulsifying surfactants for use in the emulsification embodiments of this invention include any surfactant which is capable of making an oil in water emulsion, and which does not adversely affect a component of the pill or the breaker. Suitable examples include, but are not limited to, a variety of anionic and nonionic surfactants, as well as other emulsifiers capable of promoting the formation of oil-in-water emulsions. In general, the emulsifier should be relatively hydrophilic, and blends of emulsifiers can be used to achieve the necessary qualities. Nonionic surfactants may have advantages over ionic emulsifiers; they are compatible with a broad pH range and often form more stable emulsions than do ionic emulsifiers. Particularly useful surfactants include the detergents sold under the trademarks Tween™ 20, Tween™ 80, and the phenoxypolyethoxyethanols like Triton X-10™. A most preferred surfactant is Triton X-100 (t-octylphenoxypolyethoxyethanol).

To facilitate a better understanding of the present invention, the following examples of certain aspects of some embodiments are given. In no way should the following examples be read to limit, or define, the scope of the invention.

EXAMPLES

The following procedure was used to incorporate an orthoester breaker into a fluid-loss control pill. First, 1000 mL of 13.5 calcium bromide brine were poured into a blender jar (the brine was 88.07% 14.2 calcium bromide brine and diluted with 11.93% $H_2O$ to make up 13.5 calcium bromide brine with a pH of 4.46 (ideal is 4.4)). 100 mL of the above solution was retained for purging and CL-30 processing. The blender was mixed at a 20% blender speed. 48 g of "WG-33"

gelling agent, which is available from Halliburton Energy Services, was placed into a plastic beaker and 40 mL of propylene glycol were added to it. The mixture was mixed by hand using a spatula to form a WG-33/glycol dispersion. The WG-33/glycol dispersion was then added to the brine in the blender at a slow stirring rate that was sufficient to mix the components but slow enough that air did not get introduced into the system. The mixing beaker was then purged of the dispersion by rinsing it with 95 mL of retained brine. 10 mL of 20° Be HCl were added to the brine dispersion mixture to form a base gel. The base gel was allowed to hydrate for 1 hour with no shear. 100 mL of the hydrated base gel was removed and tested as indicated in Table 1.

To mix a delayed-release acid breaker of the present invention into the base gel, 4 mL of water and 2 mL of "WS-44" emulsifier, available from Halliburton Energy Services, were added to a small beaker. To this solution, 8 mL of TPOF (tripropylorthoformate) were added and the mixture was emulsified by gentle shaking with a spatula. To this emulsion, "CL-30," a MgO crosslinking agent commercially available from Halliburton Energy Services, Inc. of Duncan, Okla., and NaOH in a small amount of water were added, and the mixture was mixed thoroughly (amounts shown in Table 1). This emulsion was then added to the hydrated gel in a Waring blender and mixed for couple of minutes. The crosslinked gel was then emptied into a jar and allowed to sit at room temperature for 1 hour to make sure it crosslinked fully. The crosslinked pills were placed in an oven at 135° F., and the time of break was observed visually (the break was indicated when a water-thin fluid resulted). The results are listed in Table 1. These steps were repeated at 160° F., and the same procedure for making observations regarding the break were done.

TABLE 1

| Component | Pill 1 100 mL Vol. | Pill 2 100 mL Vol. | Pill 3 100 mL Vol. | Pill 4 100 mL Vol. |
|---|---|---|---|---|
| Breaker - tripropyl orthoformate | 8 mL | 8 mL | 8 mL | 8 mL |
| H$_2$O | 4 mL | 4 mL | 4 mL | 4 mL |
| O/W emulsifier, WS-44 | 2 mL | 2 mL | 2 mL | 2 mL |
| MgO Crosslinking Agent "CL-30," commercially available from Halliburton Energy Services, Inc., Duncan, OK | 0.72 g | 0.72 g | 0.72 g | 0.72 g |
| inhibitor - 2M NaOH | 0 mL | 3 mL | 5 mL | 7 mL |

Results @135 F.
| Pill | Break Time |
|---|---|
| 1 | 4 days |
| 2 | 7 days |
| 3 | 10 days |
| 4 | Stopped collection of data on the 13$^{th}$ day and still no break at this point. |

Results @160 F.
| Pill | Break Time |
|---|---|
| 1 | 2 days |
| 2 | 2 days |
| 3 | 3 days |
| 4 | 7 days |

These results indicate, inter alia, that the inhibitor concentration and temperature can affect delay time for the orthoester breaker.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method comprising:
    providing a fluid-loss control pill that comprises an aqueous base fluid, a gelling agent, and a delayed-release acid breaker that comprises at least one selected from the group consisting of an orthoester, a poly(orthoester), and a combination thereof;
    introducing the fluid-loss control pill into a subterranean formation;
    allowing the delayed-release acid breaker to generate an acid after a delay period; and
    allowing the fluid-loss control pill to break.

2. The method of claim 1 wherein the orthoester has the general formula RC(OR')(OR")(OR'"), wherein R', R", and R'" are not hydrogen, and R', R", and R'" may or may not be the same group.

3. The method of claim 2 wherein R', R", or R'" comprise a heteroatom.

4. The method of claim 1 wherein the gelling agent comprises at least one polymer selected from the group consisting of: a natural polymer; a synthetic polymer; xanthan; a xanthan derivative; guar; a guar derivative; cellulose; a cellulose derivative; carboxymethylhydroxyethyl cellulose; hydroxyethyl cellulose; a graft copolymer of hydroxyethyl or hydroxypropyl cellulose prepared by a redox reaction with vinyl phosphonic acid monomers or polymers; polyacrylate; polymethacrylate; polyamylamide; polyvinyl alcohol; polyvinylpyrolidone; a depolymerized gelling agent; derivatives thereof; and a combination thereof.

5. The method of claim 1 wherein the orthoester comprises at least one orthoester selected from the group consisting of: an orthoacetate; an orthoformate; an orthopropionate; and an orthoester of a polyfunctional alcohol.

6. The method of claim 1 wherein the poly(orthoester) comprises at least one poly(orthoester) selected from the group consisting of: a poly(orthoacetate); a poly(orthoformate); and a poly(orthoproponate).

7. The method of claim 1 wherein the gelling agent comprises a crosslinked gelling agent that has been crosslinked in a crosslinking reaction that comprises a crosslinking agent.

8. The method of claim 7 wherein the crosslinking agent comprises at least one crosslinking agent selected from the group consisting of: a polyvalent metal ion; a Lewis base; a Bronsted-Lowrey base; boron; titanium; and zirconium.

9. The method of claim 1 wherein the fluid-loss control pill comprises an additive selected from the group consisting of: propylene glycol; a gel stabilizer; a clay fixer; a bridging particulate; a surfactant; a corrosion inhibitor; a biocide; a pH control additive; an oxidizer; an encapsulated breaker; and a weighting agent.

10. A method comprising:
    providing a delayed-release acid breaker that comprises at least one selected from the group consisting of an orthoester, a poly(orthoester), and a combination thereof and a fluid-loss control pill base gel having a pH below about 8;
    forming a first emulsion that comprises the delayed-release acid breaker and water;
    adding the first emulsion to the fluid-loss control pill base gel to form a second emulsion having a continuous phase and a discontinuous phase, the discontinuous phase comprising the delayed-release acid breaker and the continuous phase comprising the fluid-loss control pill base gel; and introducing the second emulsion into a subterranean formation.

11. The method of claim 10 wherein the fluid-loss control pill base gel comprises at least one selected from the group consisting of: propylene glycol; a gel stabilizer; a clay fixer; a bridging particulate; a surfactant; a corrosion inhibitor; a biocide; a pH control additive; an oxidizer; an encapsulated breaker; a weighting agent; fresh water; salt water; a brine; a zinc chloride brine; an ammonium chloride brine; seawater; a sodium chloride brine; a potassium chloride brine; a calcium chloride brine; a sodium bromide brine; a calcium bromide brine; and a zinc bromide brine.

12. The method of claim 10 wherein the orthoester has the general formula RC(OR')(OR")(OR'''), wherein R', R", and R''' are not hydrogen, and R', R", and R''' may or may not be the same group.

13. The method of claim 10 wherein the orthoester comprise at least one orthoester selected from the group consisting of: an orthoacetate; an orthoformate; an orthopropionate; and an orthoester of a polyfunctional alcohol.

14. The method of claim 10 wherein the poly(orthoester) comprises at least one poly(orthoester) selected from the group consisting of: a poly(orthoacetate); a poly(orthoformate); and a poly(orthoproponate).

15. The method of claim 10 wherein the gelling agent comprises at least one polymer selected from the group consisting of: a natural polymer; a synthetic polymer; xanthan; a xanthan derivative; guar; a guar derivative; cellulose; a cellulose derivative; carboxymethylhydroxyethyl cellulose; hydroxyethyl cellulose; a graft copolymer of hydroxyethyl or hydroxypropyl cellulose prepared by a redox reaction with vinyl phosphonic acid monomers or polymers; polyacrylate; polymethacrylate; polyamylamide; polyvinyl alcohol; polyvinylpyrolidone; a depolymerized gelling agent; a derivative thereof; and a combination thereof.

* * * * *